United States Patent [19]

Shinohara

[11] Patent Number: 5,575,569
[45] Date of Patent: Nov. 19, 1996

[54] BEARING ARRANGEMENT FOR ELECTRIC MOTOR

[75] Inventor: Tsuyoshi Shinohara, Nagoya, Japan

[73] Assignee: Kabushiki Kaisha Toshiba, Kawasaki, Japan

[21] Appl. No.: 408,972

[22] Filed: Mar. 23, 1995

[30] Foreign Application Priority Data

Mar. 24, 1994 [JP] Japan ................................. 6-053476

[51] Int. Cl.$^6$ ................................................ F16C 33/38
[52] U.S. Cl. .................................... 384/470; 384/531
[58] Field of Search ................................. 384/470, 531, 384/532, 527, 523

[56] References Cited

U.S. PATENT DOCUMENTS 3,743,369  7/1973  Langström ........................ 384/470

FOREIGN PATENT DOCUMENTS 4344144  11/1992  Japan.

*Primary Examiner*—Lenard A. Footland
*Attorney, Agent, or Firm*—Cushman, Darby & Cushman, L.L.P.

[57] ABSTRACT

A bearing supporting a rotational shaft of an electric motor includes an outer ring, an inner ring, and an annular retainer disposed between the outer and inner rings for holding a plurality of metal balls so that the balls are rollable. The retainer has a plurality of grease reserve portions formed in its upper end. Each grease reserve portion is enclosed partially by a peripheral wall. The gross amount of grease injected into the bearing is about 10% or less of a volume of an inner space of the bearing defined by the outer and inner rings and upper and lower sealing plates with the retainer and the balls in position.

12 Claims, 9 Drawing Sheets

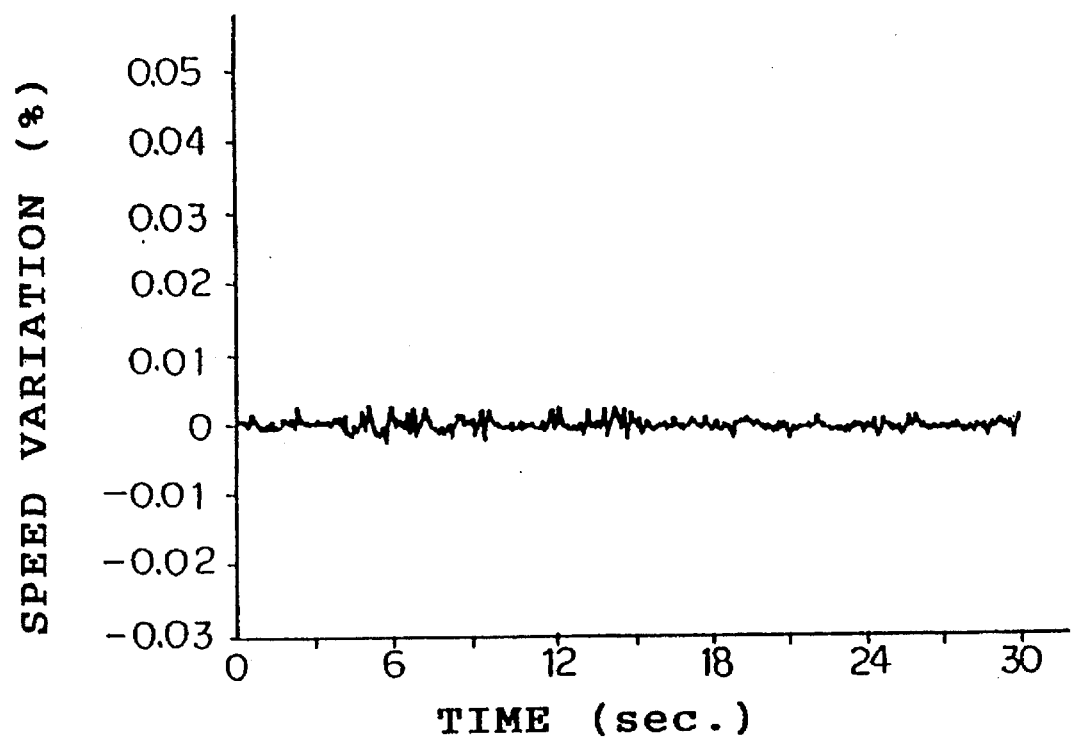
F I G. 5

BEARING ARRANGEMENT FOR ELECTRIC MOTOR

BACKGROUND OF THE INVENTION

1. Field of the Invention

This invention relates in general to a bearing arrangement for an electric motor. More particularly, the invention provides a bearing of the general type having an inner ring, an outer ring, a retainer and a plurality of rolling elements arranged in a spaced relationship between the inner and outer rings and secured by the retainer so as to be rollable.

2. Description of Related Art

A known roller bearing is shown in FIGS. 11 and 12 (Prior Art). The roller bearing shown is of the type intended to supporting a rotor of an electric motor, typically of the type used as a scanner motor employed in a laser printer.

FIG. 11 (Prior Art) is a perspective view of a retainer of the known bearing, and FIG. 12 (Prior Art) is an enlarged front view of the known bearing.

The known bearing comprises an inner ring (not shown), an outer ring (not shown), an annular retainer 2 having a plurality of receiving portions 1, and a plurality of rolling elements, such as metal balls, 3 disposed in the receiving portions, respectively. Retainer 2 is shaped so as to define a plurality of grease reserve portions 4 between adjacent pairs of receiving portions 1 along an upper side of the retainer, as viewed in FIG. 11.

As shown in FIG. 12, a lubricating grease 5 is injected into each of the grease reserve portions 4. The lubricating grease 5 is composed generally of a base oil, such as mineral oil, and a thickening agent having relatively high viscosity, such as metallic soap. The scanner motor is usually a vertical shaft type motor in which its rotational shaft extends vertically and is operated in a high speed range of 8,000 to 15,000 rpm.

In known scanner motors, a speed variation sometimes occurs momentarily during driving of the motor. FIG. 13 is a graph showing speed variations of a known motor utilizing the bearing shown in FIG. 11. This momentary, large scale speed variation is referred to conventionally as 'jitter'. Jitter causes fluctuation in the image printed by a laser beam printer and is therefore highly undesirable.

The present inventor has investigated the cause for jitter in scanner motors of laser beam printers. The investigation revealed that the grease is subjected to a centrifugal force due to rotation of the retainer. The force causes the grease to scatter out of the grease reserve portions and to deposit on the outer peripheral side of the retainer. Thereafter, the scattered grease flows excessively onto the rolling surfaces of the balls. This problem tends to occur more frequently as the temperature of the grease rises. The momentary variation in motor speed occurs when the balls contact the grease or, more specifically, a thickening agent of the grease.

SUMMARY OF THE INVENTION

Therefore, an object of the present invention is to provide a bearing for an electric motor that does not cause large momentary speed variations.

Another object of the present invention is to provide an electric motor with improved service life. Yet another object of the present invention is to provide a bearing wherein the grease can be injected readily into the grease reserve portions and retained reliably in those portions.

The present invention provides an electric motor having a novel bearing arrangement. The bearing comprises an inner ring, an outer ring, a plurality of rolling elements rollably arranged in a spaced relationship between the inner and outer rings, and an annular retainer securing the rolling elements. The annular retainer is shaped so as to define a plurality of grease reserve portions, each pair of rolling elements having a grease reserve portion therebetween, encircled by an outer peripheral wall. Each of the grease reserve portions is defined by two walls extending radially from the outer peripheral wall such that each has a substantially U-shaped configuration. A pair of sealing plates are fixed to both ends of one of the inner ring and the outer ring respectively so as to extend radially through said space therebetween. Grease injected into the grease reserve portions is limited to a gross amount set at about 10% or less of the volume of an inner volume of the bearing. The volume of the inner volume of the bearing is obtained by subtracting volumes of the retainer and the rolling members from a volume of a space defined by the inner and outer rings and the sealing plates.

The outer peripheral wall prevents the grease or its thickening agent from excessively flowing onto the outer peripheral side when subjected to centrifugal forces due to rotation of the retainer. Consequently, the grease is prevented from excessively flowing onto the rolling surfaces of the rolling elements. Heat generated during motor rotation causes the base oil component of the grease to flow easily. The centrifugal force due to rotation of the retainer causes the base oil component of the grease to flow over the peripheral walls of the grease reserve portions, whereupon the base oil component, absent the thickening agent, is supplied to the side of the rolling elements. Consequently, the rolling elements are lubricated at a suitable level without the problems associated with the thickening agents.

The outer peripheral wall of each grease reserve portion, however, cannot prevent the thickening agent of the grease from flowing into the outer peripheral side of the retainer when excessive grease is injected in each grease reserve portion. Thus, in the above-described construction, the grease injected into the grease reserve portions is limited to a gross amount about 10% or less of the volume of the inner space of the bearing. This amount of the grease was determined experimentally. Given this limitation, the grease can be supplied appropriately to the side of the rolling elements.

Reduction of the gross amount of grease, however, also reduces the base oil component of the grease supplied to the side of the rolling elements. Since this reduction lowers the lubricity of the rolling elements, the service life of the bearing is shortened. In view of this problem, the gross amount of the grease injected into the grease reserve portions is set to a minimum range of 7 to 8% of the volume of the inner space of the bearing. With this range, the grease can be supplied appropriately to the side of the rolling elements while providing sufficient lubricity for the rolling elements. Consequently, the large, momentary speed variations of the motor are prevented, and the bearing's service life can be improved.

In another embodiment of the invention, the outer peripheral wall of each grease reserve portion has a slit formed therein. Since the base oil component of the grease is supplied readily through each slit to the side of the rolling elements, the lubricity for the rolling elements can be maintained more reliably with this configuration, and the service life of the motor can be improved further.

Given that the gross amount of grease used is a function of the size of the bearing, the gross amount of grease injected into the grease reserve portions is decreased as the size of the motor is reduced. Accordingly, the lubricity for the rolling elements is lowered, and the service life of the motor is reduced concomitantly. More specifically, the service life of small-sized motors is reduced when the gross amount of grease injected into the grease reserve portions is 4 mg or less. In view of this problem, the outer peripheral wall of each grease reserve portion has a slit formed therein when the gross amount of grease injected into the grease reserve portions is to be 4 mg or less. Since the base oil component of the grease is supplied more readily through a slit, the service life of the motor can be improved effectively. When the gross amount of grease injected into the grease reserve portions is about 3.5 mg, two slits are provided in the peripheral walls of each grease reserve portion to further increase the service life of the motor.

Finally, each grease reserve portion may further include a projection disposed on the bottom of each grease reserve portion. Since the grease is retained by the projection, the grease can be injected easily into each grease reserve portion. Furthermore, retainment of the grease during rotation of the motor is enhanced by the projection.

Other objects, features and advantages of the present invention will become clear upon reviewing the following description of preferred embodiments, made with reference to the accompanying drawings.

BRIEF DESCRIPTION OF THE DRAWINGS

FIG. 5 is a graph showing speed variations of the electric motor;

DETAILED DESCRIPTION OF THE PREFERRED EMBODIMENTS

A first embodiment of the present invention will be described with reference to FIGS. 1 to 6 of the accompanying drawings. The electric motor of the present invention may be advantageously used as a scanner motor of a laser beam printer. However, one skilled in the art, will recognize readily the broader application of the present invention. For the purpose of this description, the embodiments of the present invention will be described in the context of a scanner motor.

Figure 2:
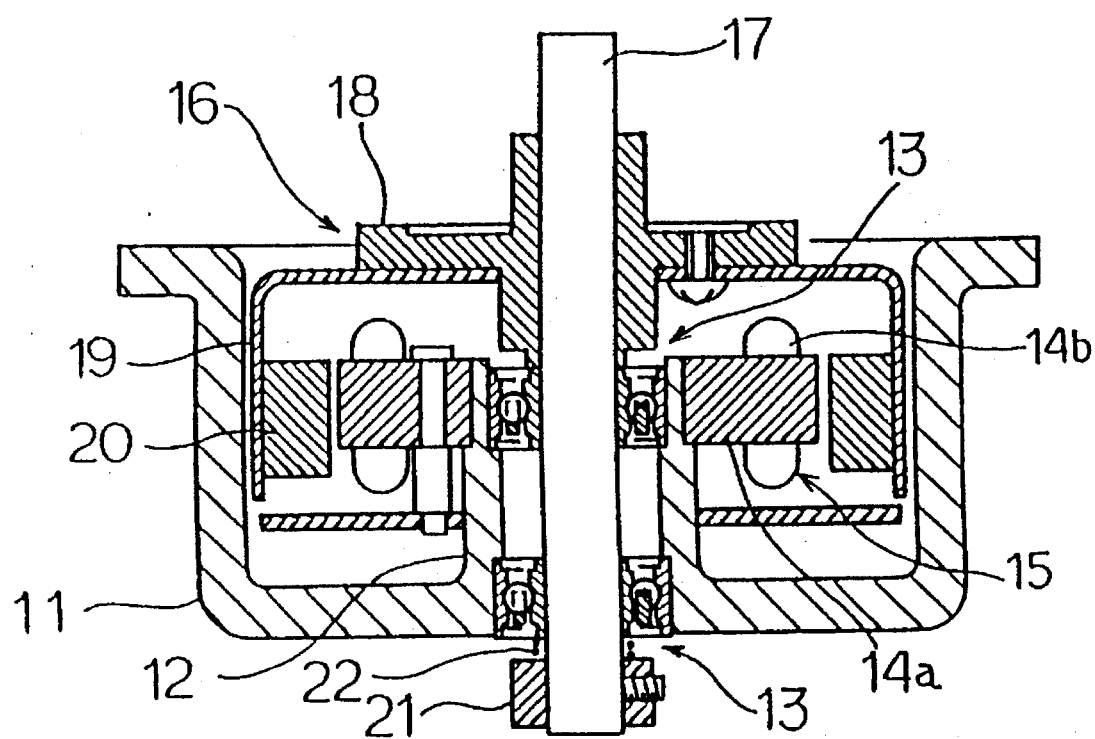
FIG. 2 is a longitudinal section of the electric motor.

FIG. 2 is a longitudinal section of the electric motor according to the present invention. The scanner motor comprises a housing 11 generally formed into the shape of a cup having an upper opening. The housing 11 has an interior, centrally positioned, cylindrical portion 12 extending upwardly from the bottom thereof. Two bearings 13, such as roller bearings, are disposed and spaced axially along an inner circumferential wall of the cylindrical portion 12. A stator core 14a is disposed on an outer circumferential wall of the cylindrical portion 12. A stator coil 14b is wound about the stator core 14a thereby forming a stator 15.

A rotor 16 of the scanner motor is supported rotatably on a rotational shaft 17 extending vertically through the bearings. A mirror mount 18 for mounting a polygon mirror (not shown) is fitted on an upper portion of the shaft 17. Fixed by a screw to the mirror mount 18, a cup-shaped rotor yoke 19 is disposed within the housing 11 for rotation relative to the housing. An annular rotor magnet 20 is mounted on the inner circumferential face of the rotor yoke 19 in an opposing, displaced relation to the stator core 14a providing a predetermined air gap therebetween. Finally, a pre-load boss 21 is mounted on the lower end of the shaft 17 with a pre-load oil spring 22 disposed between the pre-load boss 22 and the lower bearing 13.

Figure 3:
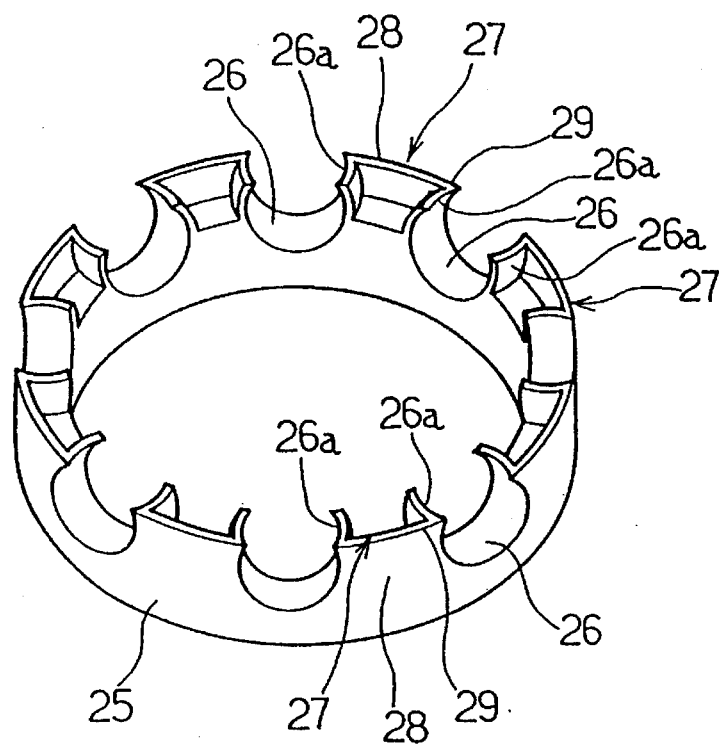
FIG. 3 is a perspective view of a retainer of the bearing.
Figure 4:
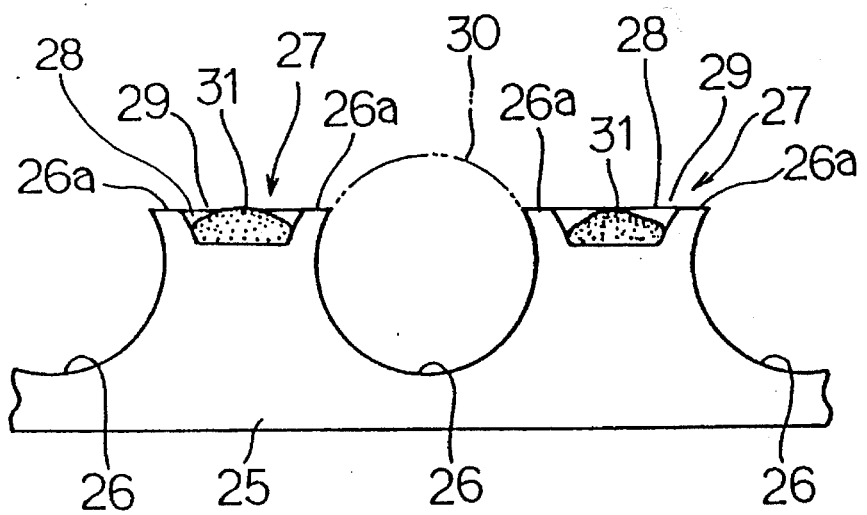
FIG. 4 is an enlarged front view of grease reserve portions of the bearing, as viewed from the inside of the retainer.

The construction of each bearing 13 will now be described. Since the axially spaced bearings 13 have the same construction, the following description, with reference to FIGS. 1, 3 and 4, is applicable equally to both.

Figure 1:
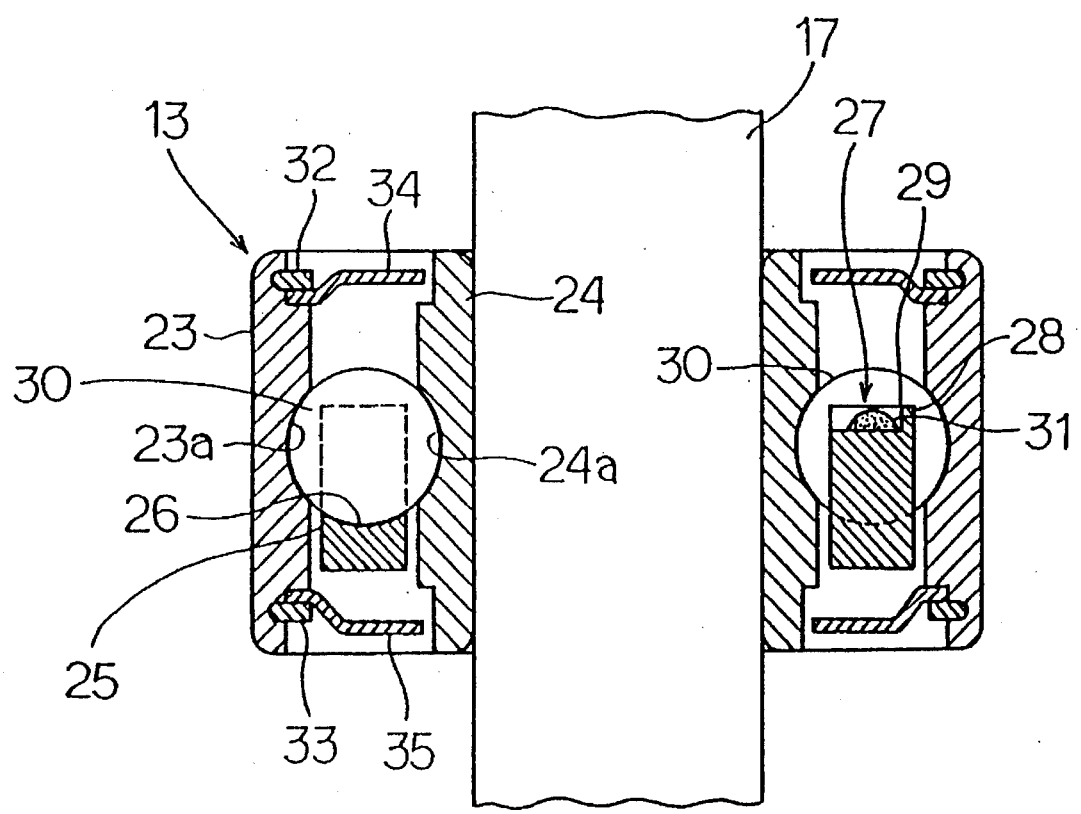
FIG. 1 is a longitudinal section of a first embodiment of a bearing of an electric motor in accordance with the present invention.

FIG. 1 is a longitudinal section of a first embodiment of a bearing of an electric motor in accordance with the present invention. Bearing 13 includes an outer ring 23 fixed to the cylindrical portion 12 of the housing 11. The outer ring 23 has an annular groove 23a formed on its inner circumferential face. Disposed coaxially and coextensive with the outer ring 23, an inner ring 24 is fixed to the shaft 17. The inner ring 24 also has an annular groove 24a formed on its outer circumferential face and is disposed in an opposing relationship to the groove 23a of the outer ring 23.

An annular retainer 25, formed of a plastic, for example, is interposed between the outer ring 23 and the inner ring 24. As shown in FIGS. 3 and 4, a plurality of regularly spaced receiving portions 26 (eight in this particular embodiment) are arranged in the upper end of the retainer 25. Each receiving portion 26 is configured to accommodate a rolling member by partially enclosing it. The retainer 25, in the present embodiment, is configured, as described below, to accommodate metal balls. One skilled in the art, however, will recognize that the present invention in its broadest concept could include other forms of rolling members. Interposed between each receiving portion 26, a plurality of grease reserve portions 27 (eight in this particular embodiment) are configured to include two upwardly rising walls 26a extending in a radial direction and an outer peripheral wall 28 connecting the walls 26a along an outside peripheral surface of the retainer 25. Thus, each grease reserve portion 27 is enclosed partially by the walls 26a and the outer peripheral wall 28 such that an upper portion remains open.

A plurality of rolling elements 30, such as metal balls, are received rollably in the receiving portions 26. The retainer 25 is disposed between the outer ring 23 and the inner ring 24 so that each rolling element 30 received within each receiving portion 26 is rollable within a space defined between the groove 23a and the groove 24a of the outer ring 23 and the inner ring 24. Once assembled, a predetermined amount of lubricating grease 31 is injected into each of the grease reserve portions 27. As discussed above, the grease 31 is composed of a base oil and a thickening agent having a relatively high viscosity. For example, mineral oil is employed as the base oil while a metallic soap such as calcium soap is employed as the thickening agent.

Sealing plate 34 and a sealing plate 35 are fixed to the upper and lower sides of the bearing 13 by a stop ring 32 and a stop ring 33, respectively. Each bearing 13 is secured to the cylindrical portion 12 of the motor housing 11 so that the grease reserve portions 27 are directed upwardly.

A gross amount of the grease 31 injected into the grease reserve portions 27 is limited to within the range of about 7 to 8% of the volume of a space defined between the outer ring 23 and the inner ring 24, and between the upper sealing plate 34 and the lower sealing plate 35 with the retainer 25 and the rolling members 30 in position. Therefore, the size of each grease reserve portion 27 including the circumferential width and the height of a peripheral wall 29 extending along the circumferential width depends upon the diameter of the bearing 13, the ball 30, and the retainer 25.

Upon rotation of the rotor 16 at high speeds, the grease 31 is subjected to frictional heat due to the rolling of each ball 30 and is subjected to a centrifugal force due to rotation of the retainer 25. Since each grease reserve portion 27 is enclosed partially by the peripheral wall 29, the thickening agent is prevented from scattering out of each grease reserve portion 27 and depositing on the outer circumferential side—even when the frictional heat increases the fluidity of the grease 31. Thus, since the thickening agent component of the grease 31 is prevented from flowing to the rolling surfaces of the rolling members 30, large speed variations of the motor can be prevented. Such a result is depicted in FIG. 5. Consequently, fluctuation in the image picture of the laser beam printer is prevented. Simultaneously, the base oil component of the grease 31 is warmed by the heat generated due to rotation of the motor and begins to flow. Thereafter, the centrifugal force due to rotation of the retainer 25 causes the base oil component to flow over the peripheral walls 29 and supply the side of the rolling members 30 with oil. Consequently, sufficient lubricity of the rolling members 30 or the bearing 13 can be ensured.

Figure 6:
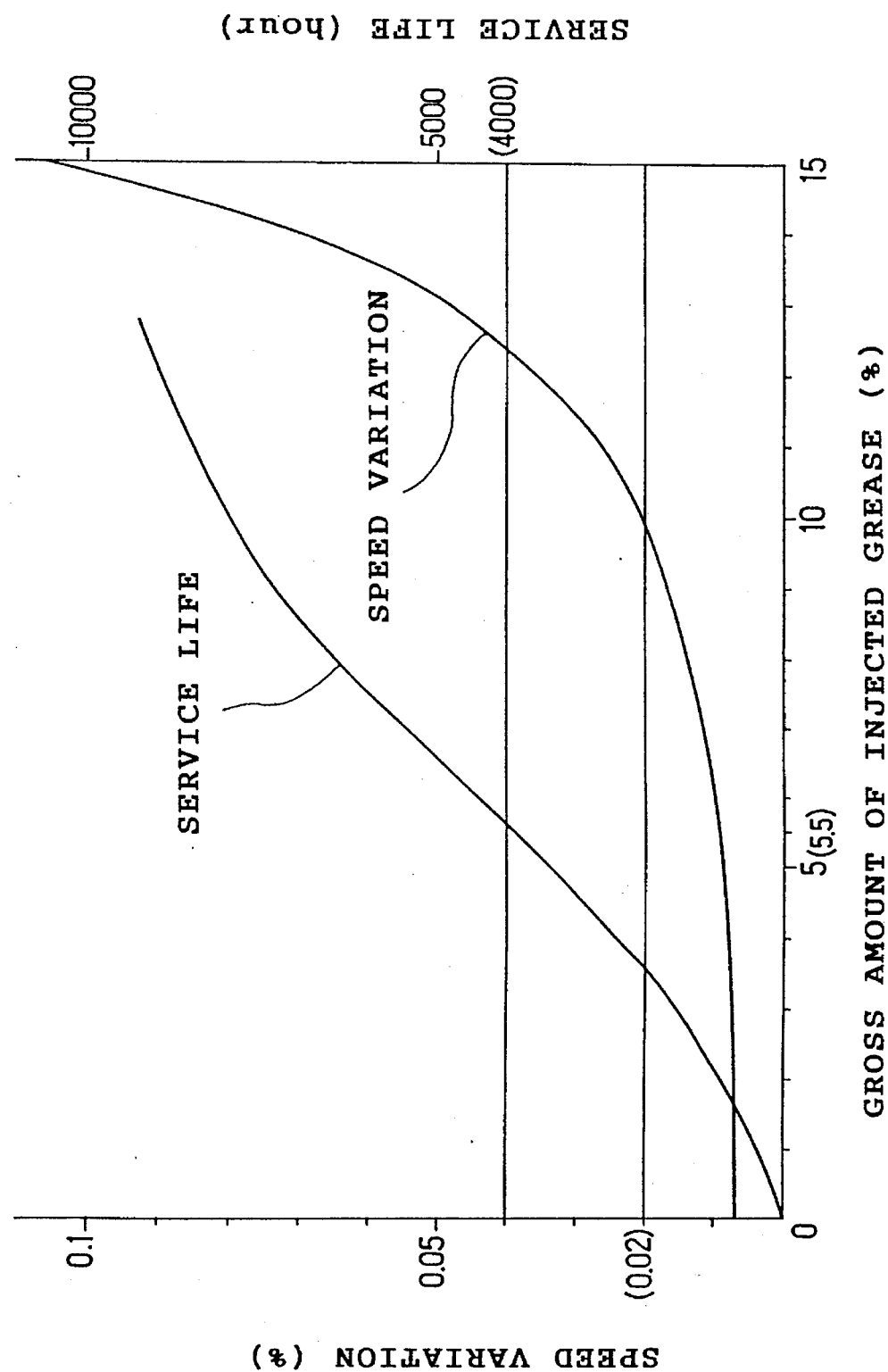
FIG. 6 is a graph showing the relationship among the ratio of gross amount of injected grease to the volume of an inner space of the bearing, speed variations of the motor, and the service life of the motor.

FIG. 6 shows the relationships among the ratio (%) of gross amount A of injected grease 31 to the volume B of a space as defined above, speed variations of the motor, and the service life of the motor. The speed variation (%) on the axis of ordinate indicates the difference between the maximum and the minimum values of the speed variations. The motor speed is set at 17,000 rpm. As is obvious from FIG. 6, the speed variation increases with the increase in the ratio A:B. Accordingly, it is preferable that the ratio A:B be approximately 10% or less when the speed variation parameter is set at 0.02%.

FIG. 6 shows that the service life of the motor is shortened as the ratio A:B is decreased. Accordingly, it is preferable that the ratio A:B be approximately 5.5% or more when the service life parameter is set at 4,000 hours. Consequently, when the ratio A:B is set in the range of about 5.5 to 10%, large speed variations are prevented, and the service life of the product can be lengthened practically. Furthermore, FIG. 6 shows that the optimum ratio A:B is in the range of about 7 to 8%.

In the prior art motor, speed variations are increased and the service life of the motor is shortened as the speed of the motor is increased. In the motor of the present invention, however, the characteristics shown in FIG. 6 are effected even when the motor speed is increased.

Figure 7:
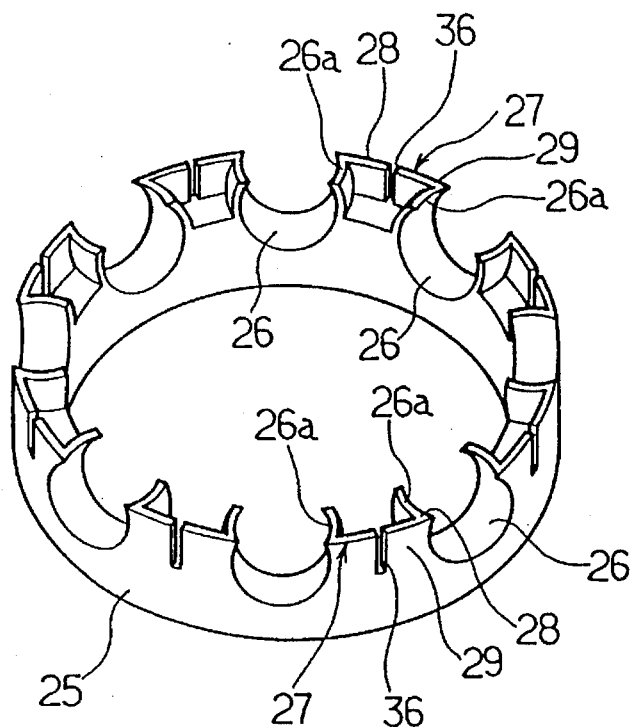
FIG. 7 is a perspective view of a second embodiment of the retainer of the present invention.

FIG. 7 is a perspective view of a second embodiment of the retainer. Identical parts are labeled by the same reference numerals as in the first embodiment. In the second embodiment, each outer peripheral wall 28 has a slit 36 formed in its circumferential central portion. The width of each slit 36 is set so that the thickening agent or the grease 31 cannot pass therethrough.

The same desirable result described above can be achieved with the second embodiment. In the second embodiment, particularly, the base oil component of the grease 31 is supplied readily through the slits 36 to the side of the rolling members 30. Consequently, sufficient lubricity is assured more reliably, and the service life of the motor is lengthened further since the peripheral walls 29 prevent the thickening agent of the grease 31 from scattering out of the grease reserve portions 27.

The diameter of the bearing 13, the diameter of each rolling member 30, and the diameter of the retainer 25 are decreased with a decrease in the diameter of the rotational shaft of the rotor 16. Even when the ratio A:B is set in the range of about 7 to 8%, in small motors, in which the diameter of rotational shafts are 4 mm or less, an absolute amount of grease 31 injected into the grease reserve portions 27 is decreased. Thus, an amount of the base oil component supplied to the rolling members 30 is decreased with the decrease in the absolute amount of grease 31. Consequently, the lubricity is lowered, and the service life of the motor is shortened. In the second embodiment, however, each outer peripheral wall 28 is provided with the slit 36 which enhances the flow of the base oil component to the rolling members 30. Consequently, sufficient lubricity can be assured.

Figure 8:
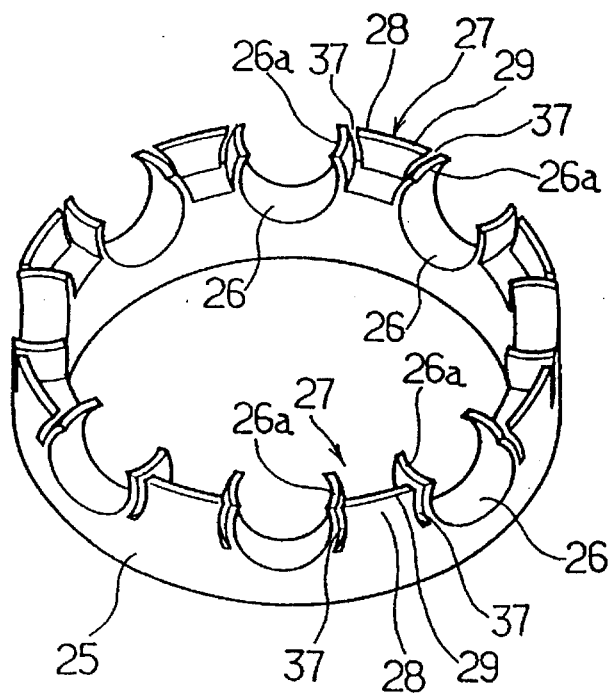
FIG. 8 is a perspective view of a third embodiment of the retainer of the present invention.

FIG. 8 is a perspective view of a third embodiment of the retainer. The identical parts are labeled by the same reference numerals as in the third embodiment as in the second embodiment. In the third embodiment, each outer peripheral wall 28 has two slits 37 disposed in the right-hand and left-hand ends thereof and extending axially, as viewed in FIG. 8. The width of each slit 37 is set so that the thickening agent of the grease 31 cannot pass therethrough. Consequently, the same effect can be achieved in the third embodiment as in the second embodiment.

Figure 9:
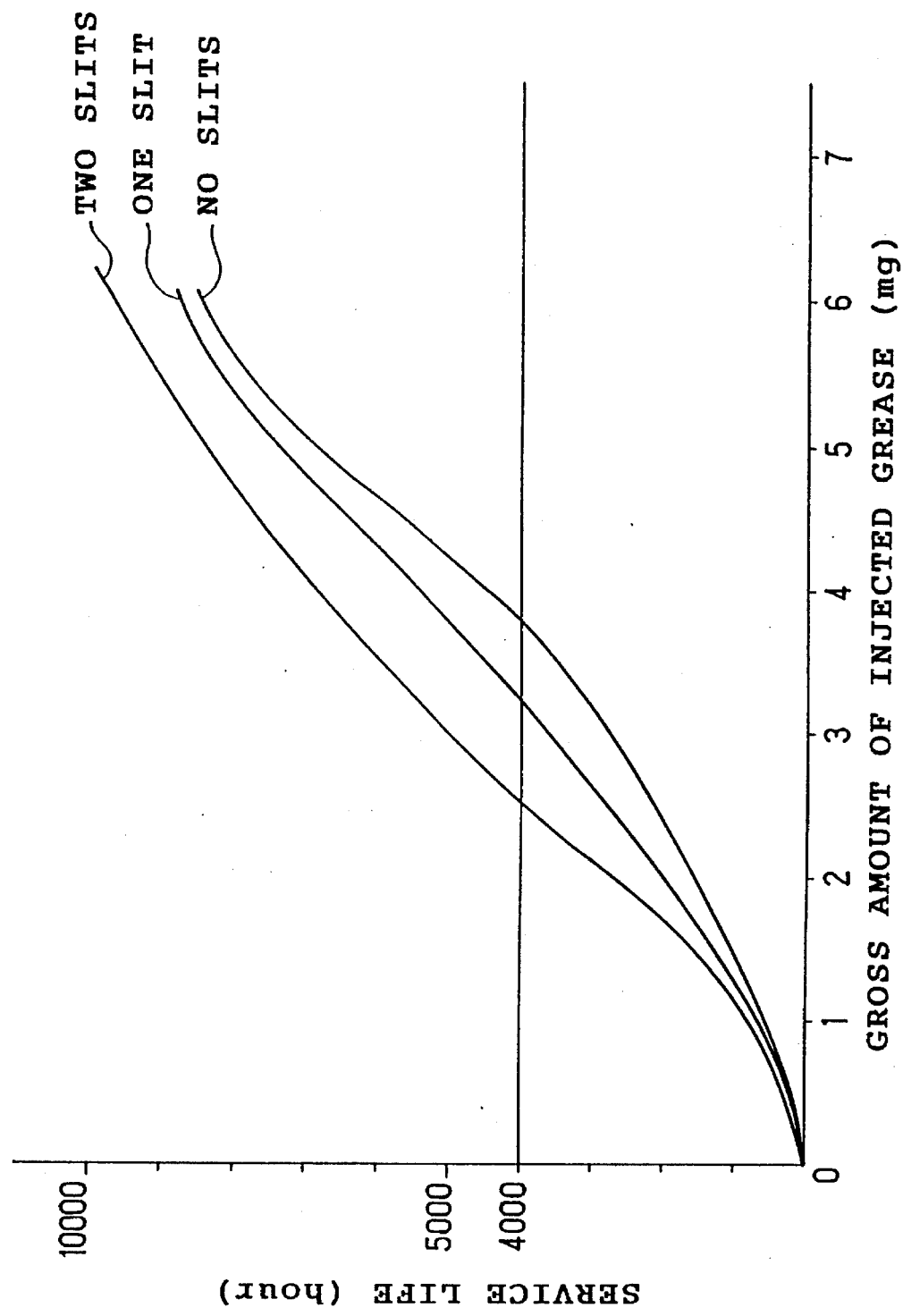
FIG. 9 is a graph showing the relationships among the number of slits, the ratio of gross amount of injected grease to the volume of the inner space of the bearing, and the service life of the motor.

FIG. 9 shows the relationship among the number of slits of each grease reserve portion 27, the gross amount C (mg) of injected grease 31, and the service life of the motor wherein the ratio A:B is set in the range of about 7 to 8%. The size of the motor is reduced as the amount of grease 31 injected in the grease reserve portions 27 is decreased. FIG. 9 shows that the service life of the motor cannot be extended to 4,000 hours when the gross amount C of grease injected in the grease reserving portions 27 is reduced below 4 mg and no slits are provided in the outer peripheral walls 28. Accordingly, when the service life of the motor must reach 4,000 hours, it is preferable that one or more slits be used in the outer peripheral wall of each grease reserve portion 27 when the gross amount C of grease 31 is about 4 mg or less. Furthermore, it is preferable that two or more slits in the outer peripheral wall 28 of each grease reserve portion 27 when the gross amount C of grease is about 3.5 mg or less.

Figure 10:
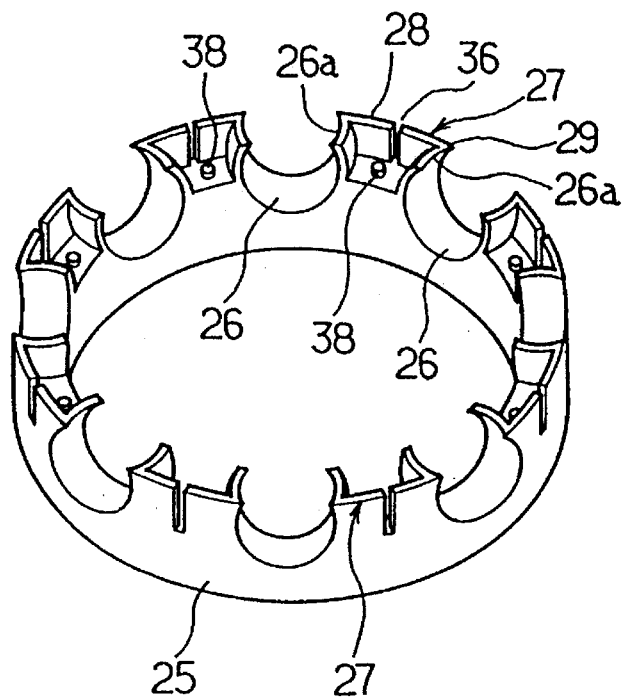
FIG. 10 is a perspective view of a fourth embodiment of the retainer of the present invention.
Figure 11:
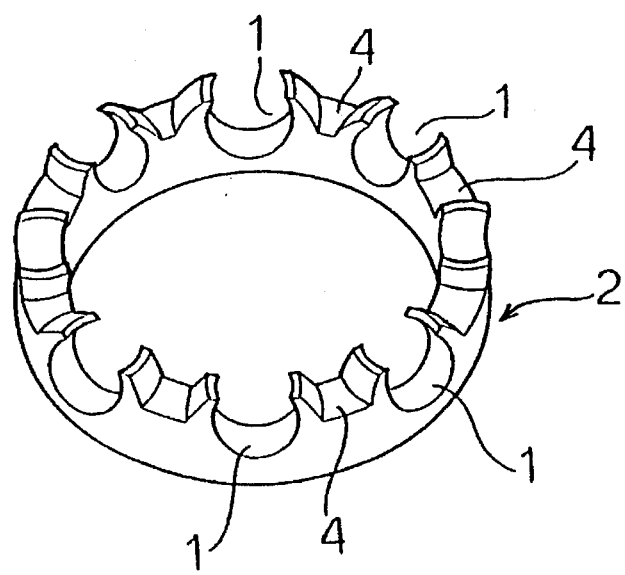
FIG. 11 is a perspective view of a retainer employed in a prior art bearing.
Figure 12:
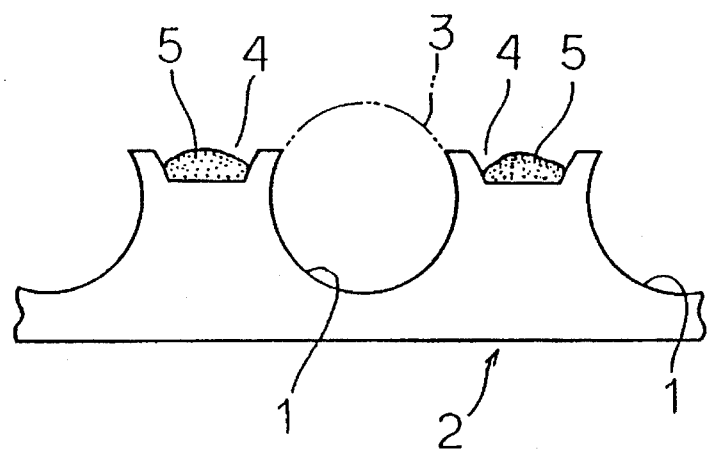
FIG. 12 is an enlarged front view of the bearing of FIG. 11.
Figure 13:
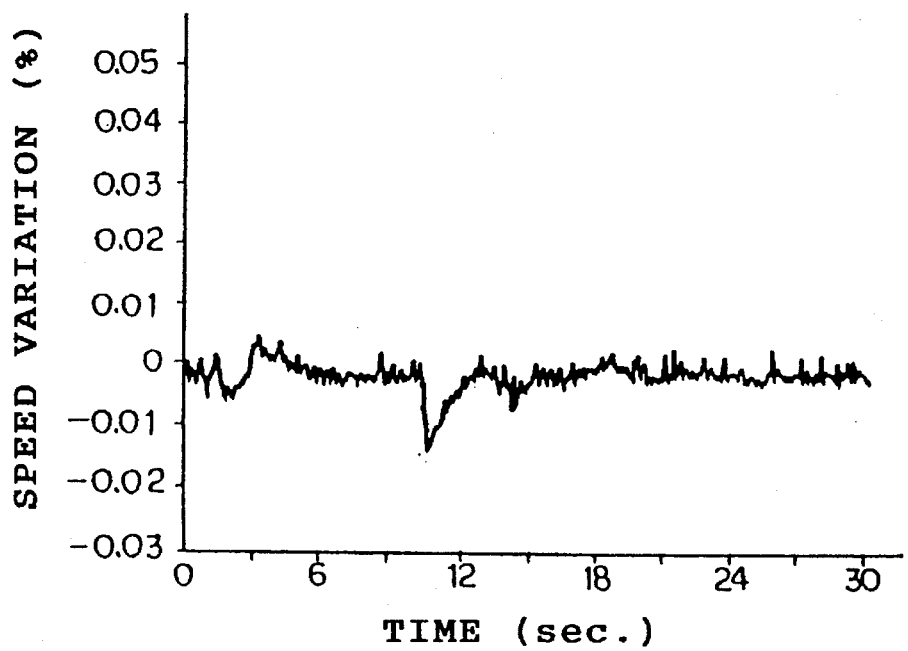
FIG. 13 is a graph showing speed variations in a prior arc motor utilizing the bearing of FIG. 11.

FIG. 10 is a perspective view of a fourth embodiment of the retainer. The difference between the second and fourth embodiments will be described. In the fourth embodiment, a short cylindrical projection 38 is formed integrally and disposed centrally on the bottom of each grease reserve portion 27. Since the grease 31 is retained readily by the projection 38 when injected into each grease reserve portion 27, the grease can be easily injected. This consequence is effective particularly when the amount of grease injected in each grease reserving portion is small. Furthermore, the grease 31 can be retained readily by the projections 38 during rotation of the motor.

Finally, the peripheral wall 29 of each grease reserve portion 27 may include an inner peripheral wall opposite the outer peripheral wall 28. The slit 36 may be formed in each wall 26a of each receiving portion 26.

Although the present invention is applied to the scanner motor of a laser beam printer in the foregoing embodiments, the invention may be applied to other types of motors as well. The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

What is claimed is:

1. A bearing arrangement for an electric motor, comprising:

an inner ring;

an outer ring disposed substantially coaxially and coextensive with the inner ring defining a space therebetween;

an annular retainer disposed in the space between the inner ring and the outer ring, the annular retainer being configured so as to define a plurality of receiving portions disposed circumferentially about the retainer, the retainer also being configured so as to define a plurality of grease reserve portions disposed circumferentially about the retainer, a grease reserve portion being provided between each pair of adjacent receiving portions, the retainer having an outer peripheral wall and a plurality of walls disposed radially from the outer peripheral wall, each of the grease reserve portions being defined by an adjacent pair of the radially disposed walls and a portion of the peripheral wall from which the pair of radial walls extend such that each of the grease reserve portions has a substantially U-shaped configuration;

a plurality of rolling members, each being received in a respective one of said receiving portions of said retainer such that each rolling member is in rolling engagement with the inner and outer rings; and grease held within the grease reserve portions of said annular retainer, wherein an amount of the grease is 10% or less of an inner volume, said inner volume being a volume of the space less a volume of the retainer and the rolling members.

2. A bearing arrangement according to claim 1, wherein the amount of grease held in the plurality of grease reserve portions is between 7 and 8% of the inner volume.

3. A bearing arrangement according to claim 2, wherein each grease reserve portion is configured so as to have a projection disposed on a bottom portion thereof.

4. A bearing arrangement according to claim 1, wherein the amount of grease held in the grease reserve portions is about 4 mg or less.

5. A bearing arrangement according to claim 4, wherein each grease reserve portion is configured so as to have a projection disposed on a bottom portion thereof.

6. A bearing arrangement according to claim 1, wherein each grease reserve portion is configured so as to have a projection disposed on a bottom portion thereof.

7. A bearing arrangement according to claim 1, wherein the peripheral wall has a slit therein corresponding to each grease reserve portion.

8. A bearing arrangement according to claim 7, wherein each grease reserve portion is configured so as to have a projection disposed on a bottom portion thereof.

9. A bearing arrangement according to claim 1, wherein the peripheral wall has two slits therein adjacent to each grease reserve portion and the amount of grease held in the grease reserve portions is about 3.5 mg.

10. A bearing arrangement according to claim 9, wherein the two slits of the peripheral wall associated with each grease reserve portion are circumferentially spaced and extending axially along said peripheral wall at each grease reserve portion.

11. A bearing arrangement according to claim 9, wherein each grease reserve portion is configured so as to have a projection disposed on a bottom portion thereof.

12. An electric motor having a stator, a rotor, and a shaft connected to the rotor extending vertically, and a bearing supporting the shaft, the bearing comprising:

an inner ring;

an outer ring disposed substantially coaxially and coextensive with the inner ring defining a space therebetween;

an annular retainer disposed in the space between the inner ring and the outer ring, the annular retainer being configured so as to define a plurality of receiving portions disposed circumferentially about the retainer, the retainer also being configured so as to define a plurality of grease reserve portions disposed circumferentially about the retainer, a grease reserve portion being provided between each pair of adjacent receiving portions, the retainer having an outer peripheral wall and a plurality of walls disposed radially from the outer peripheral wall, each of the grease reserve portions being defined by an adjacent pair of the radially disposed walls and a portion of the peripheral wall from which the pair of radial walls extend such that each of the grease reserve portions has a substantially U-shaped configuration;

a plurality of rolling members, each being received in a respective one of said receiving portions of said retainer such that each rolling member is in rolling engagement with the inner and outer rings;

a first sealing plate fixed to one end of one of the inner ring and the outer ring so as to extend radially through said space;

a second sealing plate fixed to the other end of one of the inner ring and the outer ring so as to extend radially through said space; and grease held within the grease reserve portions of said annular retainer, wherein an amount of the grease is 10% or less of an inner volume, said inner volume being a volume defined between the inner ring, the outer ring, the first sealing plate and the second sealing plate less a volume of the retainer and the rolling members.

* * * * *